(12) United States Patent
Wenstrand et al.

(10) Patent No.: US 7,161,136 B1
(45) Date of Patent: Jan. 9, 2007

(54) LIGHT MODULATING INPUT DEVICE FOR CAPTURING USER CONTROL INPUTS

(75) Inventors: John Stewart Wenstrand, Menlo Park, CA (US); Jason T. Hartlove, Los Altos, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/175,757

(22) Filed: Jul. 6, 2005

(51) Int. Cl.
*G06M 7/00* (2006.01)
*H01J 40/14* (2006.01)
(52) U.S. Cl. .................................... 250/221; 345/157
(58) Field of Classification Search ..................
250/231.13–231.18, 221, 222.1; 345/156–158, 345/160, 161, 166, 168
See application file for complete search history.

(56) References Cited

U.S. PATENT DOCUMENTS 6,333,733 B1 * 12/2001 Andersson et al. ......... 345/157

2003/0151594 A1   8/2003   Tsai
2005/0110755 A1   5/2005   Harley et al.

OTHER PUBLICATIONS

"How Computer Mice Work", Howstuffworks, pp. 1-6, (Jun. 28, 2005), <http://computer.howstuffworks.com/mouse2>.
"Optical Encoder Applications", Computer Optical Products, Inc., 7 pgs., <www.opticalencoder.com>.

* cited by examiner

*Primary Examiner*—Stephone B. Allen
*Assistant Examiner*—Suezu Ellis (57) ABSTRACT

An input device comprises a light source, a light modulator, and a sensor. The light modulator is configured to emit a path of light. The light modulator is arranged relative to the light source transversely across the path of light to produce a light contrast pattern from the light modulator. The sensor module is configured to detect relative motion between the light contrast pattern and the sensor module.

21 Claims, 6 Drawing Sheets

LIGHT MODULATING INPUT DEVICE FOR CAPTURING USER CONTROL INPUTS

BACKGROUND

The use of a hand operated pointing device for use with a computer and its display has become almost universal. One form of the various types of pointing devices is the optical pointing device. In one form of an optical pointing device, a light source within an optical pointing device illuminates a navigation surface, such as a finger or a desktop, that is external to the pointing device. Light is reflected off the navigation surface and onto an image sensor within the optical pointing device for detection as relative movement information as the pointing device is moved relative to the navigation surface. This information is used to direct a corresponding movement of a screen pointer.

Conventional imaging surfaces, such as fingertips, desktops, mouse pads, etc. typically have some noise associated with them due to dirt, surface irregularities, etc. that can interfere with generating accurate movement information. While a pointing device can control the light source and the sensor package, the quality and type of navigation surface is typically chosen by the user of the pointing device. Despite many approaches to compensating for varying types of navigation surfaces (e.g., highly reflective, highly absorbing, dirty, etc.), the quality of the navigation surface still affects performance of the optical pointing devices.

Conventional pointing devices are often too large for smaller applications, such as personal digital assistants, mobile phones, handheld computers, portable audio players, etc. In some instances, a conventional pointing device is poorly adapted to execute new functions of evolving electronic devices, as well to accommodate the widely varying shapes and configurations of these new class of electronic devices.

Accordingly, manufacturers and designers of electronic devices still face challenges in reducing the size of pointing devices while enhancing the accuracy, adaptability, and effectiveness of those pointing devices.

SUMMARY

Embodiments of the invention are directed to a light modulating input device for capturing user control inputs. In one embodiment, an input device comprises a light source, a light modulator, and a sensor. The light modulator is configured to emit a path of light. The light modulator is arranged relative to the light source transversely across the path of light to produce a light contrast pattern from the light modulator. The sensor module is configured to detect relative motion between the light contrast pattern and the sensor module.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Embodiments of the invention are directed to an input device comprising a light source for illuminating a light modulator in which motion of the illuminated light modulator relative to a sensor is detected at the sensor to capture human control inputs associated with the relative motion. In one embodiment, the light modulator is interposed between the light source and the sensor to introduce a predefined pattern in the light as it passes through the light modulator on its way to the sensor. The light modulator comprises a diffraction element, an interference element, or element producing a pattern of varying light intensities. As a result, a unique pattern of differing light intensities is received at the sensor in the form of lines, speckles, or singular dots, etc.

In one aspect, the light modulator comprises a navigation surface that is illuminated (e.g., backlit) by the light source with the sensor receiving light patterns transmitted from the backlit navigation surface. Different positions of the light modulator relative to the sensor cause differing light patterns to be received at the sensor that are compared over time to capture human control inputs. Light patterns received at the sensor for comparison are produced via a light modulator, which comprises an at least partially opaque pattern of a lens or generally transparent surface through which the light is transmitted. These transmissive light patterns are different than reflected images used in conventional optical pointing devices in which an image received at a sensor array is produced by light reflected and/or scattered off of a navigation surface, such as a mouse pad.

In one embodiment, the light source and the light modulator are fixed relative to each other to operate as a single unit that projects a light contrast pattern of varying light intensities onto a sensor. Accordingly, in this embodiment, the light source and the light modulator function as a contrast pattern projecting mechanism arranged to directly transmit a light contrast pattern onto a sensor that is positioned generally perpendicular to the transmitted light path from the projecting mechanism. Movement of the projecting mechanism, and therefore movement of the projected contrast pattern, occurs in a plane that is generally parallel to the sensor and generally perpendicular to the light transmitted from the projecting mechanism.

In one embodiment, the light source and light modulator are embodied in a mobile housing which is configured for lateral movement relative to a sensor array. In one aspect, the mobile housing comprises a puck that is slidably movable relative to a support structure with the support structure also suspending the light modulator of the puck in a spaced relationship relative to the sensor array to enable light to be transmitted through the light modulator for reception at the sensor array. In one embodiment, a constraining mechanism limits lateral movement of the mobile housing within a predefined field of motion relative to the sensor array.

Embodiments of the invention are directed to generating relative motion information to capture human control inputs. These inputs are used for controlling a screen pointer, selecting or manipulating symbols visible on a display device, video game controllers, for direct control of a mechanical or electrical system such as speed and turn inputs for controlling an automobile or toy vehicle, or any other application where one-dimensional or two-dimensional control inputs are useful. Additional examples include portable electronic devices, such as mobile phones, portable audio devices, personal digital assistants, electronic cameras, etc.

These embodiments, and others, and described and illustrated in greater detail in association with FIGS. 1–7B.

Figure 1A:
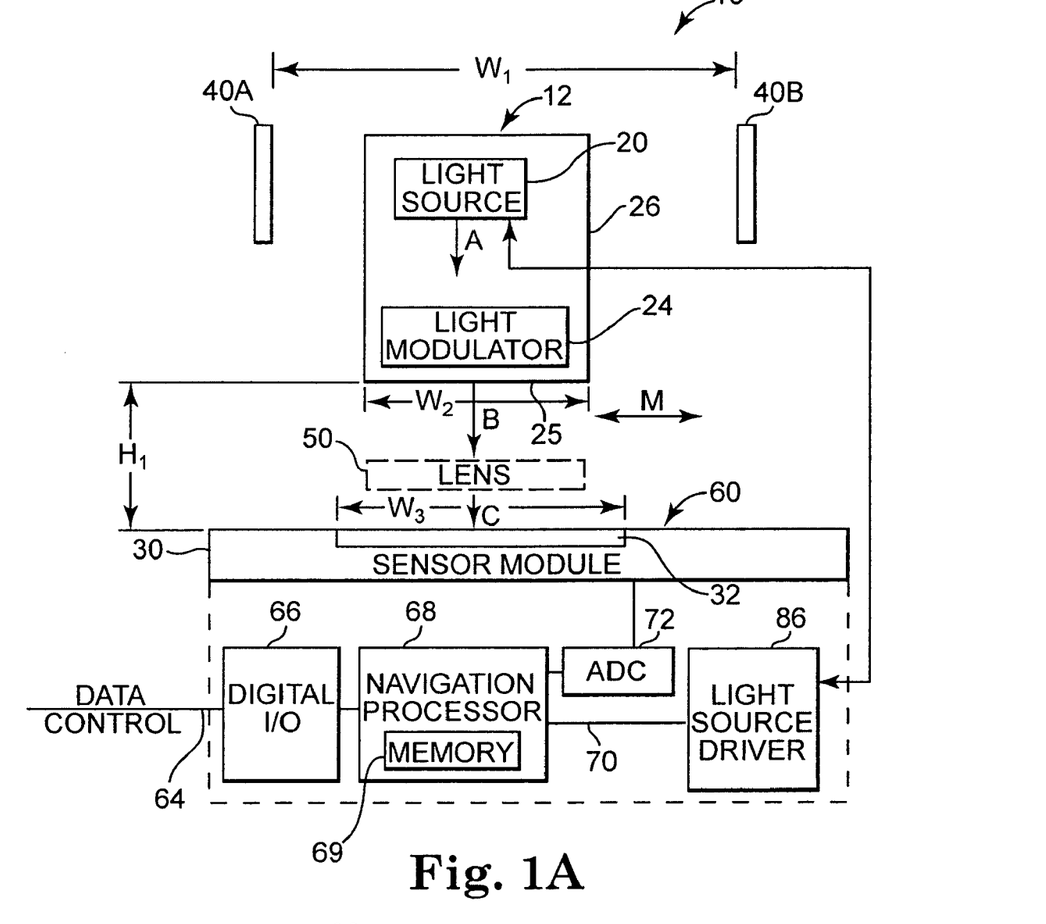
FIG. 1A is a block diagram illustrating major components of an optical input device, according to one embodiment of the present invention.

FIG. 1A is a block diagram illustrating major components of an optical input device 10 according to one embodiment of the present invention. As shown in FIG. 1A, optical input device 10 comprises mobile housing 12 and sensor module 30 including photodetector array 32. Mobile housing 12 comprises light source 20 and light modulator 24 with first surface 25. In one embodiment, first surface 25 defines a navigation surface.

In one embodiment, optical input device 10 also comprises lens 50 disposed between first surface 25 of mobile housing 12 and sensor module 30, serving to image first surface 25 upon photodetector array 32. This embodiment is employed when there is a relatively large distance (H1) between first surface 25 and photodetector array 32 of sensor module 30. In another embodiment, lens 50 is omitted when height (H1) between first surface 25 and photodetector array 32 of sensor module 30 is relatively small or negligible. This small height enables first surface 25 to be imaged at photodetector array 32 at an adequate resolution without an intervening lens.

In one embodiment, input device 10 is in electrical communication with and supports operation of a display to serve as a pointing device for controlling a screen pointer on the display. In another embodiment, input device 10 is not restricted to controlling a screen pointer, and is used more generally to capture user inputs for a wide variety of devices and applications as previously described.

As shown in FIG. 1A, in one embodiment mobile housing 12 is configured for lateral movement (as indicated by directional arrow M) between boundaries 40A and 40B, while also being maintained in a generally vertical position above and spaced apart from sensor module 30 (as indicated by height H1). First surface 25 of mobile housing 12 is maintained in a generally parallel position relative to photodetector array 32 of sensor module 30. In one embodiment, boundaries 40A and 40B are separated by a width W1 and together generally define a field of motion through which housing 12 is permitted to move laterally relative to sensor module 30. In one aspect, a width of photodetector array 32 generally corresponds to the width W1 between boundaries 40A and 40B, and therefore generally corresponds to the field of motion of housing 12.

In one embodiment, light modulator 24 comprises an at least partially transparent member (e.g., a surface, lens, or other member) that modulates or alters light from light source 20 that is transmitted through light modulator 24 to produce an image suitable for detection at photodetector array 32. In one aspect, light modulator 24 comprises a distinctive opaque pattern on a generally transparent member (or conversely, a transparent pattern on a generally opaque member) suitable for comparison with other like images received at photodetector array 32. Additional aspects of contrast patterns (i.e., light patterns having light and dark portions of varying intensity) produced via light modulator 24 are described and illustrated in greater detail in association with FIGS. 2–6B.

In one aspect, because first surface 25 of housing 12 effectively acts as a navigation surface, movement information generated via photodetector array 32 based on first surface 25 is highly accurate because the features of this navigation surface are known and relatively stable. In one embodiment, first surface 25 is generally excluded from dust, markings, etc. that otherwise can cause noise or bad pixels in digital images corresponding to the navigation surface. Accordingly, embodiments of the invention enable control over the type and quality of navigation surface as well as protection of the navigation surface based on its general exclusion from ambient conditions (external to input device 10), as will be further illustrated in association with FIGS. 3–4.

In one embodiment, sensor module 30 forms a portion of optical navigation sensor integrated circuit (IC) 60. As shown in FIG. 1A, optical navigation sensor 60 includes digital input/output circuitry 66, navigation processor 68, analog to digital converter (ADC) 72, photodetector array 32 (of sensor module 30), and light source driver circuit 86. In one embodiment, sensor 60 comprises an electronic image sensor, including but not limited to, a charge coupled device (CCD) or a complimentary metal oxide semiconductor-active pixel sensors (CMOS-APS). Both types of sensors contain an array of photodetectors (e.g., pixels), arranged in a pattern.

In operation, according to one embodiment, light source 20 emits light (A) through light modulator 24 (which also defines navigation surface 25), and illuminated images (B) are generated. In one embodiment, light source 20 is a light emitting diode. In one embodiment, light source 20 is a coherent light source or an at least partially coherent light source. In one embodiment, light source 20 is a laser. In one form of the invention, light source 20 is a vertical cavity surface emitting laser (VCSEL) diode. In another form of the invention, light source 20 is an edge emitting laser diode. Light source 20 is controlled by driver circuit 86, which is controlled by navigation processor 68 via control line 70. In one embodiment, control line 70 is used by navigation processor 68 to cause driver circuit 86 to be powered on and off, and correspondingly cause light source 20 to be powered on and off.

Images (B) emanating from first surface 25 of mobile housing 12 are projected directly onto photodetector array 32 without interaction (e.g., reflection) with any intervening structures. Each photodetector in photodetector array 32 provides a signal that varies in magnitude based upon the intensity of light incident on the photodetector. The signals from photo array 32 are output to analog to digital converter (ADC) 72, which converts the signals into digital values of a suitable resolution (e.g., six bits). The digital values provide a digital representation of the illuminated pattern on photodetector array 32 produced via transmission of light through navigation surface 25, which acts as a light modulator. The digital values generated by analog to digital converter 72 are output to navigation processor 68. The digital values received by navigation processor 68 are stored as a frame within memory 69. Different frames of light patterns detected at photodetector array 32 are compared over time. In one aspect, successive frames are compared while in other aspects, non-sequential frames are compared.

In another aspect, as shown in FIG. 1A, light modulator 24 has width (W2) and photodetector array 32 has a width (W3). In one aspect, a width of each of respective light modulator 24 and photodetector array 32 inferentially generally corresponds to a surface area of the respective light modulator 24 and sensor array. Accordingly, in one embodiment, light modulator 24 has a surface area (inferentially represented by width W2) that is substantially larger than a surface area of photodetector array 32 (inferentially represented by width W3). In this embodiment, light modulator 24 comprises a plurality of opaque features spaced apart on a generally transparent member so that as light modulator 24 is moved relative to photodetector array 32, the light contrast pattern detected at photodetector array 32 generally corresponds to a unique position of light modulator 24 relative to photodetector array 32. Frames of newly detected light contrast patterns are compared with reference frames of detected light contrast patterns to thereby determine a direction, amount and speed of relative motion of the light contrast pattern relative to the photodetector array 32.

In another embodiment, light modulator 24 has a surface area (inferentially represented by width W2) that is substantially less than a surface area of photodetector array 32 (inferentially represented by width W3). In this embodiment, light modulator 24 comprises a single opaque feature centrally arranged on a generally transparent member so that as light modulator 24 is moved relative to photodetector array 32, the single opaque feature generally corresponds to a unique absolute position of light modulator 24 relative to sensor array 24. The single opaque feature enables direct tracking of the absolute position of the opaque feature without using frame comparison techniques. This direct tracking mechanism indicates a direction and magnitude of relative motion of the light contrast pattern relative to photodetector array 32.

In one embodiment, relative movement between light modulator 24 and the sensor module 30 occurs in a generally singular plane along two dimensions. In another embodiment, relative movement between the light modulator 24 and the sensor module 30 also occurs along a generally singular plane but is restricted to movement along a single dimension.

Figure 1B:
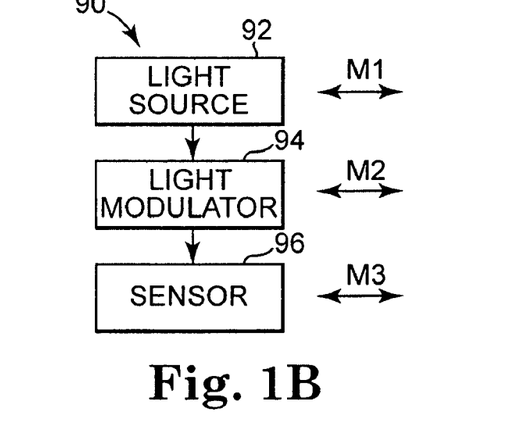
FIG. 1B is a block diagram illustrating an optical input device, according to an embodiment of the present invention.

FIG. 1B is a block diagram illustrating an input device 90, according to an embodiment of the invention. As shown in FIG. 1A, input device 90 comprises light source 92, light modulator 94 and sensor 96, which have substantially the same features and attributes as previously described for light source 34, light modulator 24, and sensor module 30 of input device 10 in association with FIG. 1A.

As shown in FIG. 1B, light modulator 94 is positioned transversely across a path of light emitted from light source 92 to produce a light contrast pattern (i.e., a pattern of varying light intensities) that is directly transmitted to sensor 96. Relative motion between the light contrast pattern and sensor 96 is detected at sensor 96. FIG. 1B illustrates different arrangements of enabling relative motion among light source 92, light modulator 94 and sensor 96 to produce changing light patterns at sensor 96 to capture human control inputs.

In one embodiment, as already represented in FIG. 1A, light source 92 and light modulator 94 are fixed relative to each other but movable as single unit relative to a fixed sensor 96. In another embodiment, light source 92 is fixed relative to a fixed sensor 96, and light modulator 94 is movable relative to both light source 92 and sensor 96. In another embodiment, light modulator 94 and sensor 96 are fixed relative to each other and light source 92 is movable relative to light modulator 94. In addition, other combinations are possible such as light source 92 and light modulator 94 being fixed relative to each other, but sensor 96 being movable relative to both light modulator 94 and light source 92. Each of these different embodiments represented by FIG. 1B use light transmitted through light modulator 94 to produce a changing pattern of light detected at sensor 96 over time to thereby capture human control inputs associated with the motion of one or more of light source 92, light modulator 94, and sensor 96 relative to each other.

Different aspects of these embodiments of input device 90 are described and illustrated in further detail in association with FIGS. 1 and 2–7B.

Figure 2:
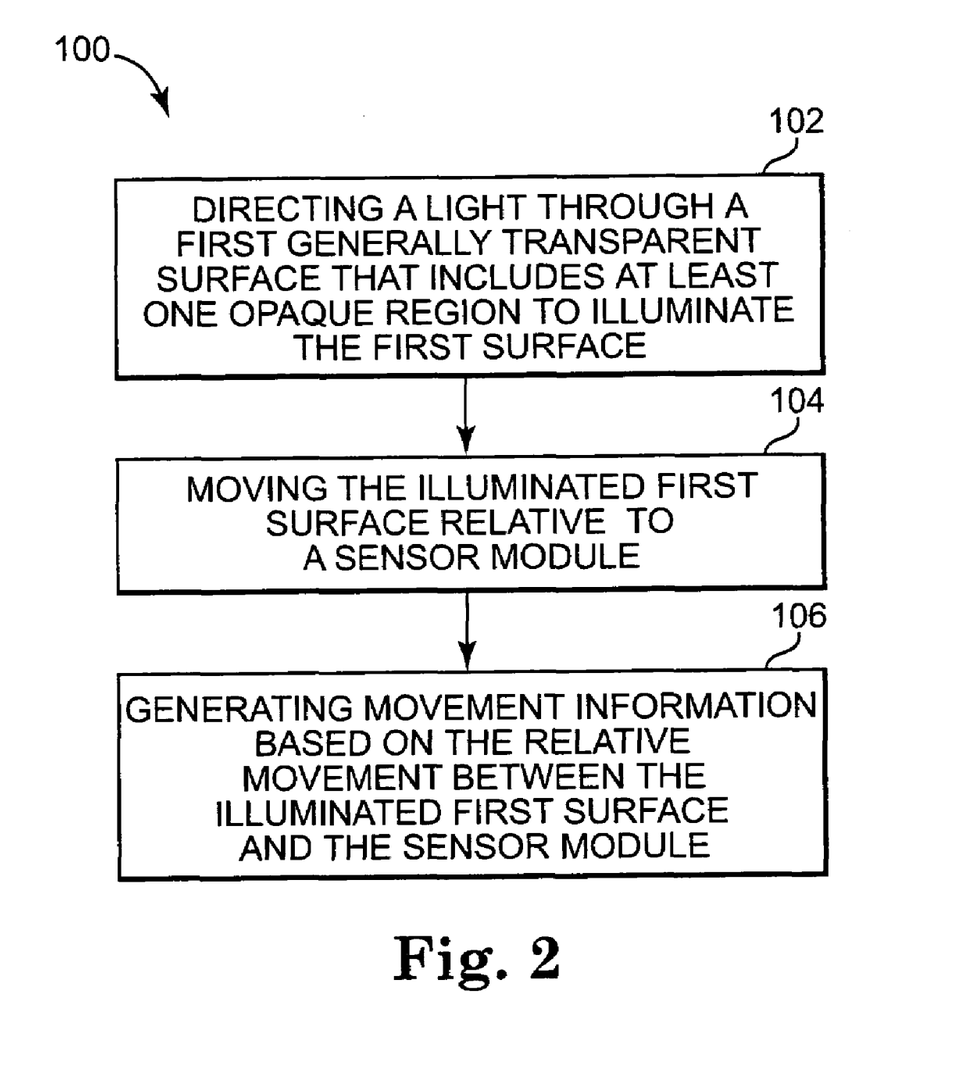
FIG. 2 is a flow diagram illustrating a method for generating movement data, according to one embodiment of the present invention.

FIG. 2 illustrates a method 100 of optical navigation using a pointing device, according to an embodiment of the invention. As shown in FIG. 2, at 102, a path of light is directed from a light source through a generally transparent first surface that includes at least one opaque region. In one aspect, the at least one opaque region comprises a plurality of opaque portions spaced apart from each other over the generally transparent surface to form a known or predefined pattern. In one aspect, the plurality of opaque portions comprises a pseudo-random pattern with each of the opaque portions varying in size and shape, and with varying spacing between adjacent opaque portions. In another aspect, the first surface conversely comprises a generally opaque member including a plurality of transparent regions or portions arranged in a manner substantially the same as the previously described plurality of opaque portions (on the generally transparent member).

At 104, the illuminated surface is moved relative to the sensor module in a generally lateral orientation. In one aspect, this lateral movement occurs in two dimensions that are generally horizontal relative to the sensor array. In another aspect, this relative movement of the illuminated surface relative to the sensor array is constrained to a single dimension that is generally horizontal relative to the sensor array.

At 106, movement information is generated based on the relative movement between the first surface and the sensor module. In one aspect, although the pattern of opaque portions (or transparent portions, conversely) is fixed on the first surface, illuminated light contrast patterns (e.g., light contrasting images) received at the sensor array are differentiated by their relative position as detected on the sensor array as the first surface is moved relative to the sensor array. Comparison of these differently positioned light contrast patterns (relative to the sensor array) enables determining a magnitude and direction of movement of the first surface to generate relative motion information for human control inputs.

In one aspect, light contrast patterns received at the sensor array for comparison are images of an illuminated surface through which light was transmitted on its path to the sensor array. These transmissive images or transmissive light patterns (i.e., images or patterns created by transmission of light through a transparent member) are different than reflected images used in conventional optical pointing devices in which an image received at a sensor array is produced by reflection off of a surface.

In one embodiment, method 100 is performed using input device 10 as previously described and illustrated in association with FIG. 1A, and as well as pointing devices 90, 150, 250, or 275, as described in association with FIGS. 1B, 4, 5A–5B, 6A–6B, and 7A–7B.

Figure 3:
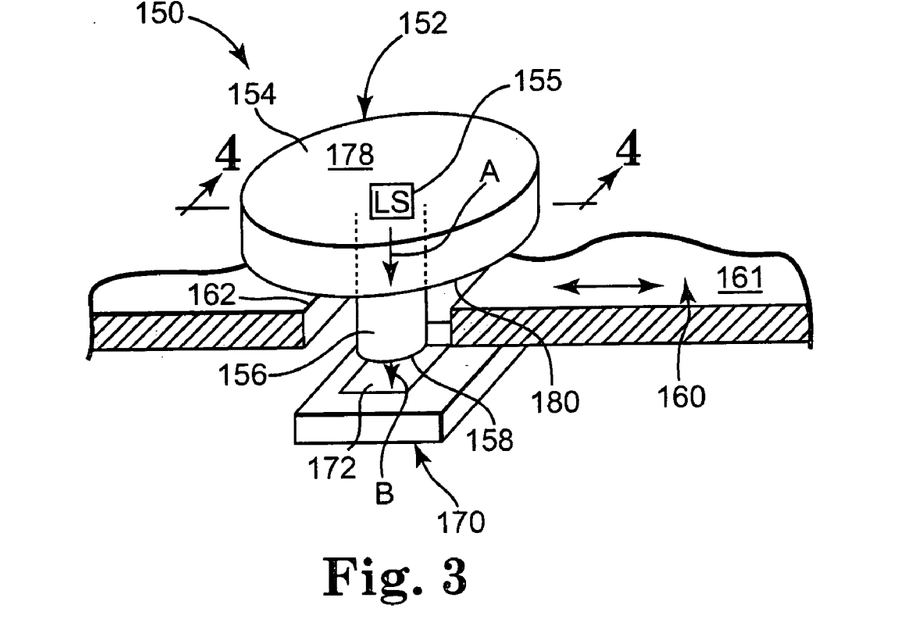
FIG. 3 is a perspective view of an input device, according to one embodiment of the present invention.

FIG. 3 illustrates a pointing device 150, according to an embodiment of the invention. As shown in FIG. 3, pointing device 150 comprises puck 152, support structure 160, and sensor module 170. In one embodiment, puck 152 and sensor module 170 have substantially the same features and attributes as mobile housing 12 and sensor module 30, as previously described in association with FIG. 1A.

In one embodiment, puck 152 comprises first portion 154 and second portion 156 with the second portion 156 extending generally outward, and generally perpendicular relative to first portion 154. In one embodiment, first portion 154 comprises a generally disc-shaped member while second portion 156 comprises a generally cylindrically shaped or tubular shaped member. In one aspect, first portion 154 and/or second portion 156 comprises light source 155 for illuminating first surface 158 (i.e., a navigation surface) of second portion 156. First portion 154 of puck 152 also comprises upper surface 178 and a bottom surface 180.

In another embodiment, first portion 154 comprises other shaped members, such as a generally rectangular shaped member while second portion 156 also comprises other shaped members such as a generally rectangular shaped member.

In one embodiment, light source 155 comprises a light emitting diode (LED). In another embodiment, light source 155 comprises a portion of light that is conveyed to puck 152 from an external location, such as a remote LED, and then fed via a light guide into puck 152 to produce light source 155 within the puck 152. This latter embodiment is substantially the same as the embodiment later described in association with FIGS. 7A–7B.

As shown in FIG. 3, support structure 160 comprises top surface 161, opening 162, and bottom surface 163. Opening 162 has a shape (e.g., generally circular) and a width that enables constrained movement of second portion 156 of puck 152 within opening 162. Accordingly, second portion 156 is allowed to move freely in a generally unlimited manner, such as side-to-side motion, spiral motion, etc., within the boundary defined by the sidewalls of hole 162 of support structure 160. In another embodiment, opening 162 defines an elongate slot to enable slidable movement of second portion 156 of puck 152 along a single dimension relative to support structure 160.

As shown in FIG. 3, top surface 161 of support structure 160 is arranged for sliding contact with bottom surface 180 of first portion 154. First portion 154 is sized and shaped to enable a finger to engage upper surface 178 for laterally moving first portion 154 of puck 152 relative to support structure 160. Movement of first portion 154 relative to support structure 160 causes movement of second portion 156 relative to sensor array 172 of sensor module 170, thereby producing relative motion of a light contrast pattern (projected from second portion 156) and sensor array 172 to enable capturing user control inputs.

Figure 4:
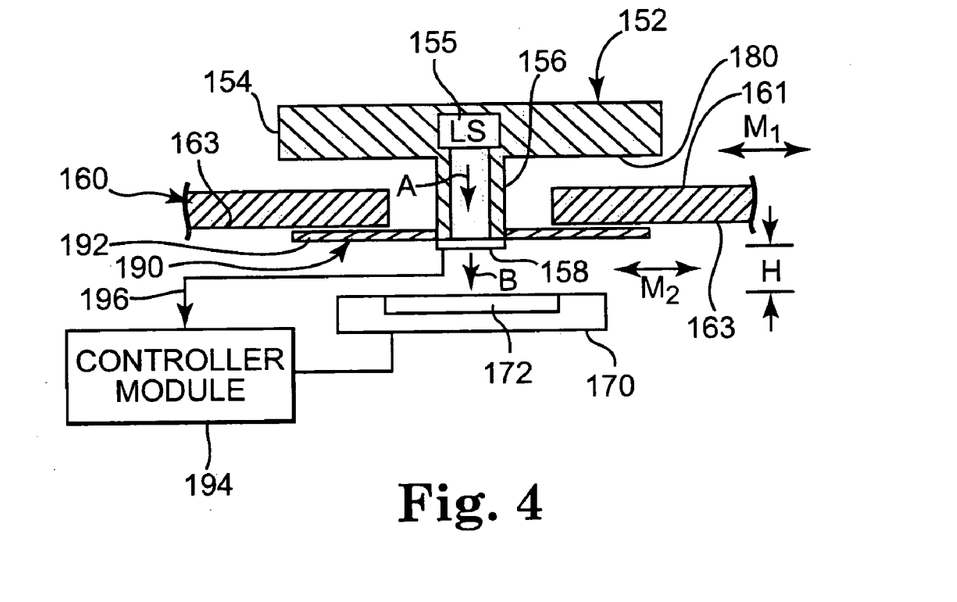
FIG. 4 is a sectional view of the input device of FIG. 3, as taken along lines 4—4, according to one embodiment of the present invention.

FIG. 4 is a sectional view of FIG. 3, as taken along lines 4–4, according to an embodiment of the invention. As shown in FIG. 4, pointing device 152 comprises the features and attributes illustrated in FIG. 3, and further comprises retaining mechanism 190 for preventing second portion 156 of puck 152 from being lifted out of (or falling out of) hole 162. In one embodiment, retaining mechanism 190 comprises a generally disc shaped member or a pair of finger-like projections or wings 192 that loosely engage bottom surface 163 of support structure 161. In one aspect, retaining mechanism 190 does not restrict or limit lateral movement of puck 154 relative to support structure 160.

In another embodiment, retaining mechanism 190 permits lateral movement of puck 154 relative to support structure 160 but is also biased against support structure 160 to maintain puck 152 in a stationary position to prevent unintended lateral movement of puck 152 until or unless a force is applied by the user to move puck 152 laterally relative to support structure 160. In one aspect, restraining mechanism 190, when biased against support structure 160, acts to maintain a constant height between first surface 158 and sensor array 172.

In other embodiments, pointing device 150 includes other mechanisms, such as re-centering mechanisms, for controlling the motion of puck 152 relative to support structure 160, as later described in association with FIGS. 7A–7B.

As shown in FIG. 4, in one embodiment, controller module 194 is a simplified representation of sensor integrated circuit 60 (FIG. 1) and is in electrical communication with light source 155 via lines 196. In one aspect, control lines 196 extend into and within second portion 156 for connection with light source 155 within puck 154.

Accordingly, movement of first portion 154 of puck 152 (as indicated by arrow M1) causes movement of navigation surface 158 (as indicated by arrow M2) relative to sensor array 172 to generate relative motion information to capture human control inputs.

Figure 5A:
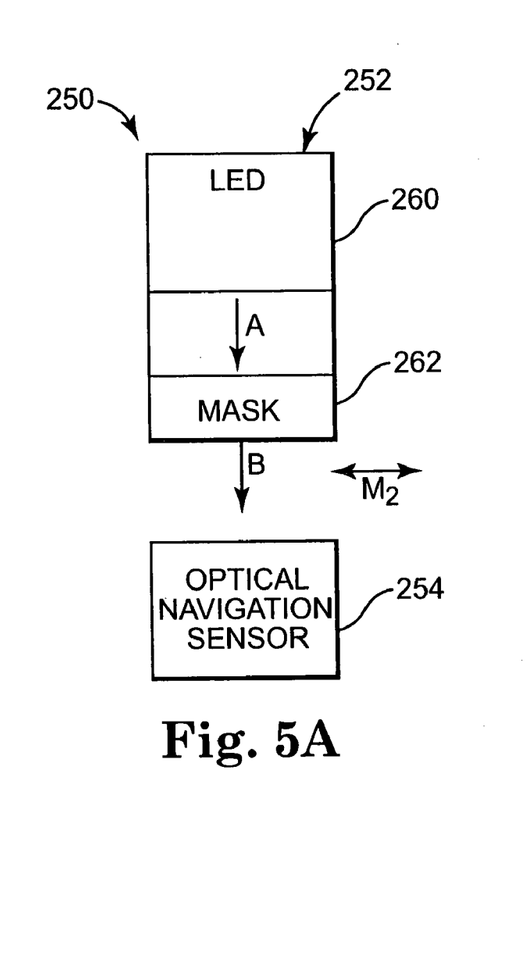
FIG. 5A is a block diagram illustrating major components of an optical input device, according to one embodiment of the present invention.

FIG. 5A is a block diagram illustrating a pointing device 250, according to an embodiment of the invention. Pointing device 250 comprises substantially the same features and attributes as input device 10, 90 and 150, as previously described in association with FIGS. 1A–4. As shown in FIG. 5A, pointing device 250 comprises mobile housing 252 and optical navigation sensor 254 with mobile housing 252 comprising light source 260 and light modulator 262. In one embodiment, light source 260 comprises a light emitting diode (LED). In another embodiment, light source 260 comprises other light sources, such as those producing substantially coherent light or at least partially coherent light.

In one embodiment, light modulator 262 comprises a mask for modulating light emitted from light source 260 prior to reception at optical navigation sensor 254. In one aspect, light modulator 262 comprises a shadow mask, aperture grill, or related structure including a transparent member with a predefined pattern of opaque portions to cause absorption, scattering, etc. of light, thereby serving to form an illumination pattern of light modulator 262 at navigation sensor 254.

Figure 5B:
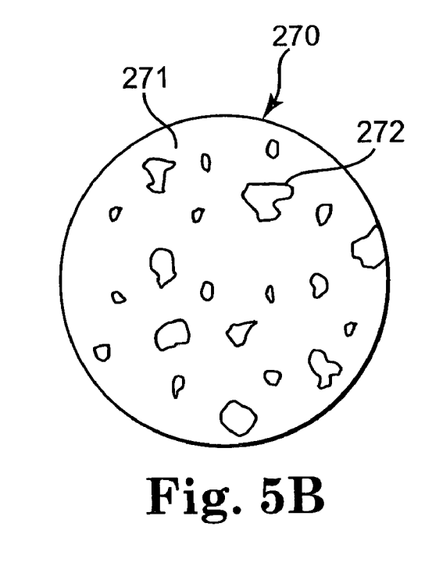
FIG. 5B is a plan view illustrating a light modulator, according to one embodiment of the present invention.

FIG. 5B is a plan view of a mask 270, according to an embodiment of the invention. As shown in FIG. 5B, mask 270 comprises a generally disc shaped member (having a generally circularly shaped appearance when seen in a plan view) that generally corresponds to a cross-sectional shape of mobile housing 252. In other embodiments, mask 270 comprises a generally rectangular shaped member or other shape suitable for serving as a transverse member to modulate a path of light.

In one embodiment, mask 270 is a generally transparent member 271 that includes a plurality of opaque portions 272 spaced apart from each other and arranged in a distinctive, fixed pattern. In one embodiment, opaque portions 272 are arranged in a pattern generally corresponding to a pseudo-random pattern. In one aspect, the plurality of opaque portions vary in size and/or shape with the pattern defining varying spacing between adjacent opaque portions 272. In one aspect, a surface area occupied by the plurality of opaque portions 272 (including the spacing between opaque portions 272) is substantially larger than a surface area of a sensor array of navigation sensor 254 to thereby enable unique comparisons of light patterns at navigation sensor 254 as relative motion occurs between mask 270 and a sensor array of navigation sensor 254. The unique comparisons are based on variations in the size, shape, and position of the opaque portions 272.

In another embodiment, mask 270 is a generally opaque member 271 that includes a plurality of transparent portions 272. In another embodiment, mask 270 is a semi-transparent member 271 that includes a plurality of opaque portions 272.

As previously described, the pattern on mask 270 is arranged to enable comparison of a sequence of images or light patterns of the illuminated mask 270. Each image or different light pattern in the comparison generally corresponds to a different position of mask 270 relative to optical navigation sensor 254 as mask 270 (as part of housing 252) is moved relative to optical navigation sensor 254. Comparison of these differing images or differing light patterns enables determining a speed and/or direction of motion of housing 277 and enables movement information to be generated to capture user control inputs associated with optical navigation sensor 254.

Figure 5C:
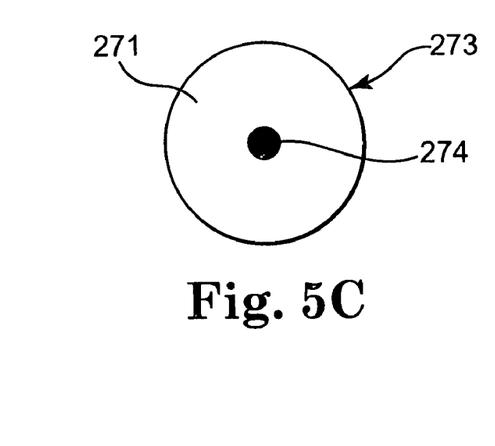
FIG. 5C is a plan view illustrating a light modulator, according to one embodiment of the present invention.

FIG. 5C is a plan view of a mask 273, according to an embodiment of the invention. As shown in FIG. 5B, mask 273 comprises a generally disc shaped member (having a generally circularly shaped appearance when seen in a plan view) that generally corresponds to a cross-sectional shape of mobile housing 252. Mask 273 is a generally transparent member 271 that includes a single centrally located opaque portion 274. Opaque portion 274 includes a generally circular shape. In other embodiments, opaque portion 274 comprises any one of a generally rectangular shape, a generally triangular shape, or other shape suitable for direct tracking by optical navigation sensor 254

In other embodiments, mask 273 comprises a generally rectangular shaped member or other shaped member. In another embodiment, mask 273 comprises a generally opaque portion 271 with a centrally located transparent portion 274.

In one aspect, a surface area of opaque portion 274 is substantially smaller than a surface area of a sensor array of navigation sensor 254 to thereby enable direct tracking of the speed and/or direction of opaque portion 274 at navigation sensor 254 to capture user control inputs as relative motion occurs between mask 273 and a sensor array of navigation sensor 254.

Figure 6A:
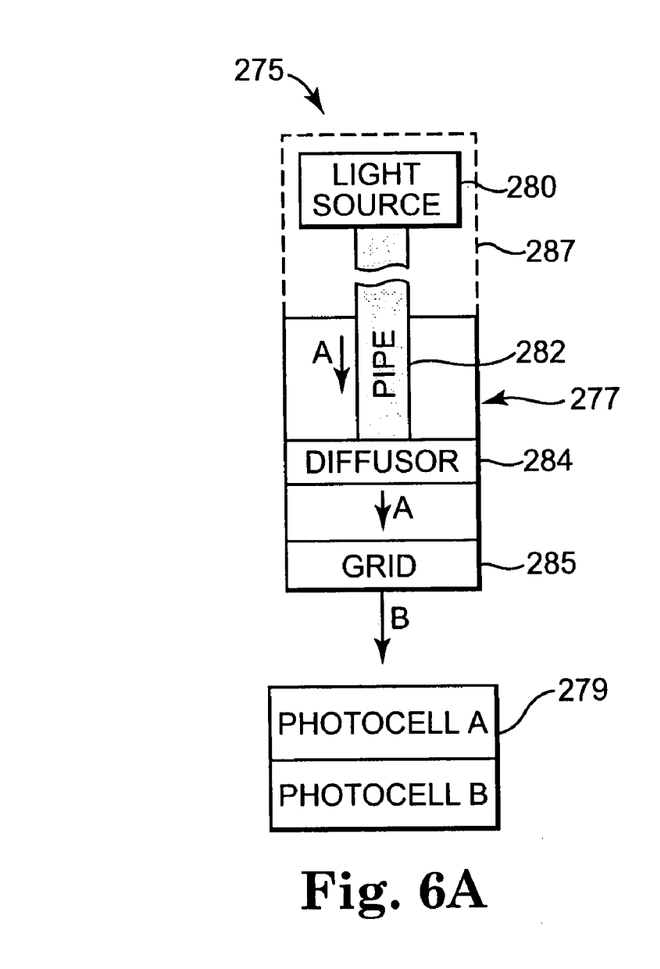
FIG. 6A is a block diagram illustrating major components of an optical input device, according to one embodiment of the present invention.

FIG. 6A is a block diagram illustrating a pointing device 275, according to an embodiment of the invention. Pointing device 275 comprises substantially the same features and attributes as input device 10, 90 and 150, as previously described in association with FIGS. 1A–4. As shown in FIG. 6A, pointing device 275 comprises mobile housing 277 and optical navigation sensor 279. In one embodiment, mobile housing 277 comprises light source 280, light pipe 282, diffuser 284, and light modulator 285. In one aspect, light source 280 is a light emitting diode (LED) with light emitted from the LED traveling through light pipe 282 and diffuser 284 to and through light modulator 285.

In one embodiment, light modulator 285 comprises a grid or other mechanism for modulating light emitted from light source 280 (and which travels through light pipe 282 and diffuser 284) prior to reception at photocell array 279. In one aspect, photocell array 279 comprises photocell A and photocell B arranged generally side-by-side manner. Light modulator 285 is configured, so that when illuminated via backlighting relative to photocell sensor array 279, to enable a phase shift detection algorithm or quadrature-type detection algorithm to be used to detect motion of the light modulator 285, and generate relative motion information for capturing user control inputs.

In one embodiment, pointing device 275 comprises an external portion 287 that is external to and/or an extension of mobile housing 277 at which light source 280 is positioned external of mobile housing 277. In this embodiment, light pipe 282 extends outside of mobile housing 277 to receive light from light source 280, so that light source 280 need not be contained within mobile housing 277. In one aspect, light pipe 282 comprises a length that enables light to travel from light source 280 positioned outside mobile housing 277 into mobile housing 277 and then into diffuser 284 and through light modulator 285.

Figure 6B:
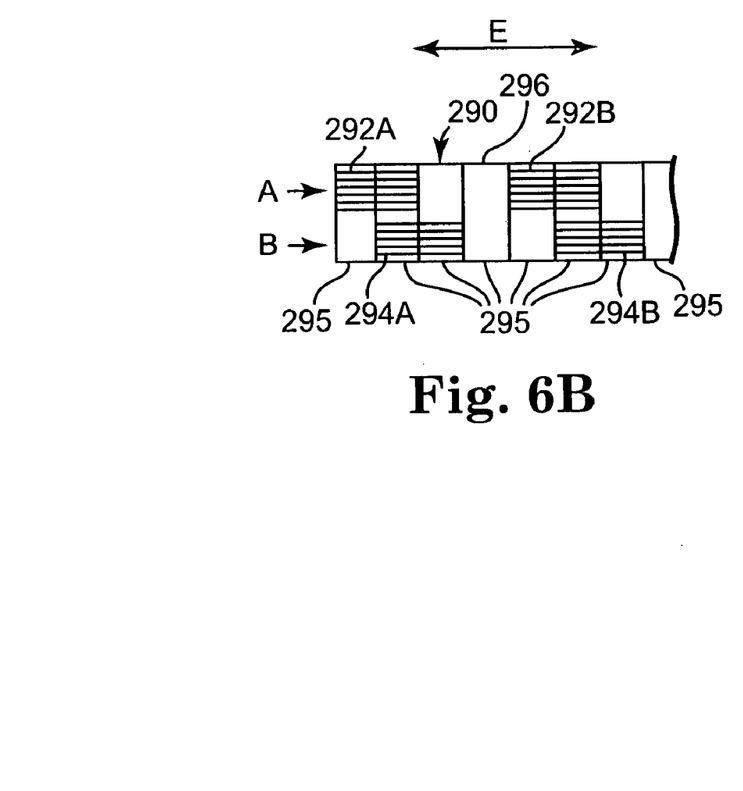
FIG. 6B is a plan view illustrating a light modulator, according to one embodiment of the present invention.

FIG. 6B comprises a plan view of a grid 290 as one embodiment of light modulator 285, according to an embodiment of the invention. As shown in FIG. 6B, grid 290 comprises an elongate, generally rectangular shaped member, with only a portion of grid 290 is shown for illustrative purposes. Grid 290 is a generally transparent member including an array of modules 295 arranged side-by-side in series, which further define channels A and B. Channel A is defined by a plurality of marked portions 292A and 292B which are arranged in series, with at least one unmarked portion 296 disposed between adjacent marked portions 292A and 292B. Channel B is defined by a plurality of marked portions 294A and 294B arranged in series, with at least one unmarked portion 296 interposed between adjacent marked portions 294A and 294B. Marked portion 292A of channel A has a position that overlaps marked portion 294A of channel B, and marked portion 292B of channel A has a position generally overlapping marked portion 294B of channel B.

In one embodiment, grid 290 is arranged as a light modulator such as light modulator 285 shown in FIG. 6A as positioned over sensor array 279. In particular, grid 290 is positioned so that channel A of grid 290 (including marked portions 292A, 292B) is positioned over photocell A and channel B of grid 290 (including marked portions 294A, 294B) is positioned over photocell B.

In use, images detected at photocell A relative to channel A and images detected at photocell B relative to channel B caused by movement of grid 290 along a single direction of motion (as indicated by directional arrow E) enables generating movement information based on relative movement of mobile housing 277 relative to photocell array 279.

Movement information is generated via comparison of images via a phase-shift detection algorithm or quadature-type detection algorithm.

Figure 7A:
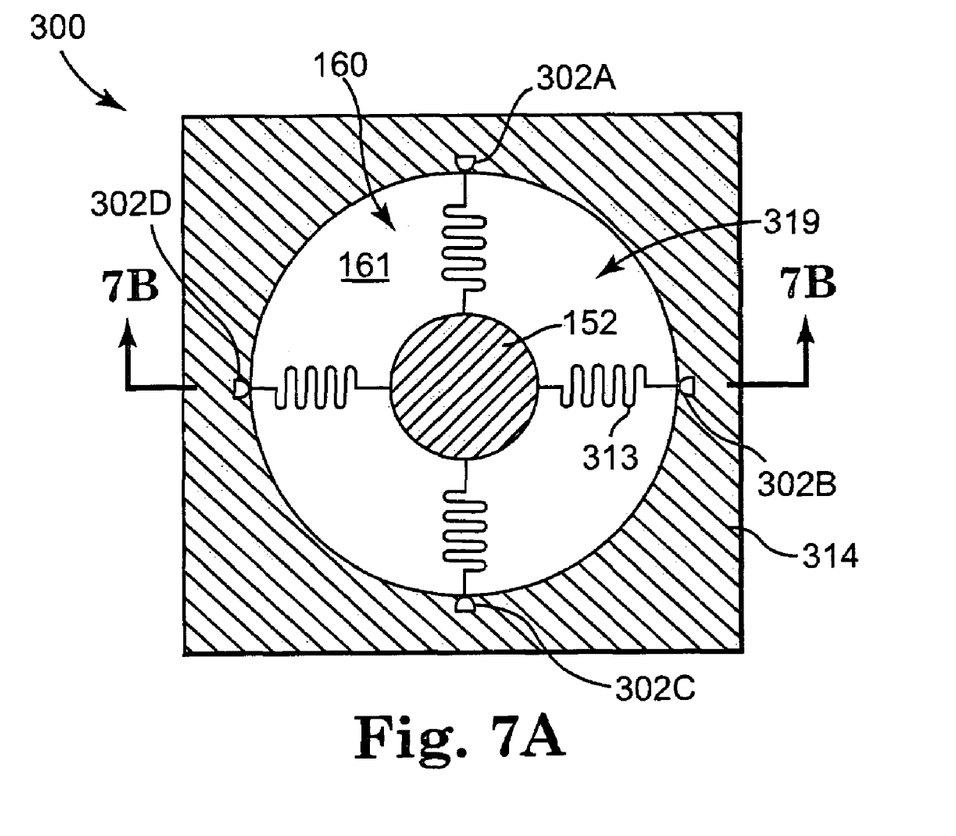
FIG. 7A is a top plan view illustrating an optical input device, according to an embodiment of the present invention.
Figure 7B:
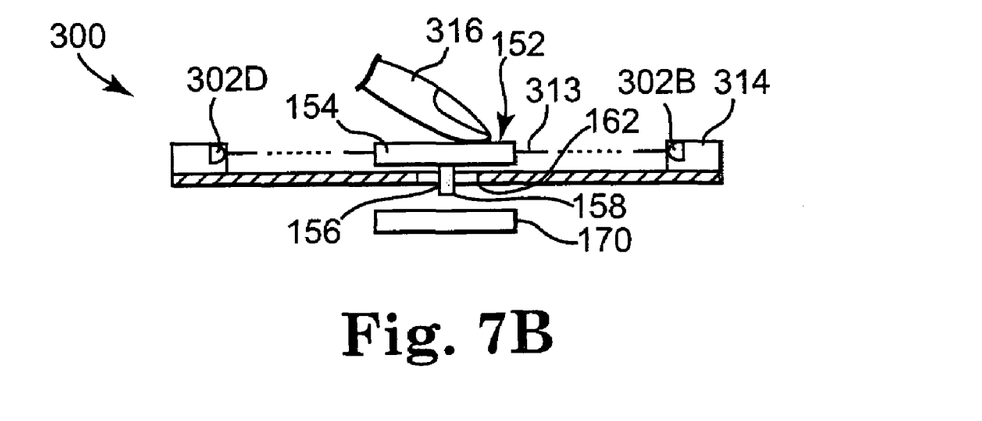
FIG. 7B is a sectional view of the input device of FIG. 7A, as taken along lines 7B—7B, according to one embodiment of the present invention.

FIG. 7A is diagram illustrating a top view of a pointing device 300, according to another embodiment of the present invention. FIG. 7B is a diagram illustrating a cross-sectional view along section line 7B—7B of the pointing device 300 shown in FIG. 7A according to one embodiment of the present invention. In the illustrated embodiment, pointing device 300 is configured in substantially the same manner as pointing device 150 (FIGS. 3–4), but puck 152 of pointing device 300 does not include a light source 155 contained directly within puck housing 154. Rather, pointing device 300 includes at least one of four light sources 302A–302D positioned about a periphery of the field of motion 319. Each of the light sources 302A–302D is positioned adjacent to one of the springs 313. In one form of the invention, springs 313 are formed from plastic, and are configured as light pipes to guide visible light from light sources 302A–302D to puck 152. In another form of the invention, fiber optic lines are attached to or inserted through springs 313, to guide light from light sources 302A–302D to puck 152. In one embodiment, light sources 102A–102D are LEDs. Accordingly, springs 313 act to bring light from a remote source to puck 152 for transmission through light modulator 158 (shown in FIG. 7B) for reception at sensor module 170 (which is not seen in FIG. 7A, but shown in FIG. 7B) to enable image comparisons to generate relative motion information to capture user control inputs.

In one aspect, springs 313 also act as a re-centering mechanism to further constrain motion of puck 152 to a field of motion. In particular, when the user moves puck 152 (using finger 319) laterally outward from a center region of slide surface 153 (e.g., top surface 161 in FIGS. 3–4) and then releases puck 152 by removing their finger 316 from puck 152, puck 152 is returned to its centered position by the springs 313 that connect the puck 152 to the side 314 of the puck field of motion 319. In one aspect, user control inputs associated with puck 152 are deactivated when puck 152 is released for automatic re-centering. This aspect mimics the action of a conventional mouse when lifting the mouse from an edge of a navigation surface (e.g. a mouse pad) and replacing the mouse at the center of the navigation surface.

In another embodiment, springs 313 do not act as light pipes to convey light into puck housing 154 but act only as a re-centering mechanism to re-center puck 152 within puck field of motion 319. In this case, puck 152 includes its own light source contained within puck housing 154.

Embodiments of the invention are directed to an input device that uses an illuminated light modulator to serve as a navigation surface to enable an optical navigation sensor to base its movement calculations on transmissive images, i.e., light contrast patterns created by transmission of light through the navigation surface. In one aspect, the navigation surface is conveniently arranged in direct proximity to the sensor array with no intervening structures therebetween and with little risk for contamination from ambient sources. In one embodiment, the navigation surface is arranged in a puck that is slidably movable over a support structure (e.g., slide pad) that also encloses the sensor array and the navigation surface from the ambient environment. Movement information for the input device is based on relative movement between the illuminated navigation surface and a sensor array. In this manner, the nature and type of the navigation surface is tightly controlled to produce highly accurate movement information for capturing user control inputs.

It will be understood by a person of ordinary skill in the art that functions performed by optical pointing devices 10, 90 150, 250, 275, and 300 may be implemented in hardware, software, firmware, or any combination thereof. The implementation may be via a microprocessor, programmable logic device, and state machine, or combinations thereof. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An input device for capturing user control inputs, the input device comprising:
   a light source configured to omit a path of light;
   a light modulator arranged relative to the light source transversely across the path of light to produce a light contrast pattern from the light modulator, the light modulator comprising a generally transparent member including at least one opaque element and the light modulator being fixed relative to the light source; and
   a sensor module including an electronic image sensor and configured to detect relative motion between the light contrast pattern and the sensor module via comparison of images of the light contrast pattern over a period of time to generate positional movement data of the light source and the light modulator relative to the sensor module.

2. The input device of claim 1 and further comprising:
   a housing containing the light source and the light modulator and the light modulator positioned at a first surface of the housing to project the light contrast pattern from the first surface; and
   a support structure configured to maintain the first surface of the housing in a spaced relationship relative to the sensor module and to enable lateral movement of the first surface of the housing relative to the sensor module.

3. The input device of claim 2 wherein the housing comprises a first portion and a second portion extending generally perpendicularly outward from the first portion wherein the first portion of the housing is in sliding contact relative to the support structure and the second portion of the housing protrudes through an opening of the support structure to limit lateral movement of the housing relative to the support structure.

4. The input device of claim 3 wherein the first portion of the housing defines a puck and the input device further comprises a re-centering mechanism arranged at the support structure to maintain the puck within a predefined field of motion.

5. The input device of claim 1 and further comprising a controller for causing a screen pointer to move on a display in response to the relative movement between the light modulator and the sensor module, the magnitude and direction of motion of the screen pointer cursor being determined by the magnitude and direction of motion of the light modulator relative to the sensor module.

6. The input device of claim 1 wherein the light modulator comprises a mask defining a pseudo-random pattern of opaque portions, the light source comprises a light emitting diode, and the electronic image sensor of the sensor module comprises an optical navigation sensor.

7. The input device of claim 1 wherein the light source comprises at least one of a generally incoherent light source a partially coherent light source.

8. The input device of claim 1 wherein the electronic image sensor of the sensor module comprises a photodetector array, and the light modulator is configured so that the light contrast pattern has a surface area substantially larger than a surface area of the photodetector array of the electronic image sensor.

9. The input device of claim 1 wherein the relative motion between the light modulator and the sensor module is constrained along a single dimension of notion.

10. An input device for capturing user control inputs, the input device comprising:
a light source configured to emit a path of light;
a light modulator arranged relative to the light source transversely across the path of a light to produce a light contrast pattern from the light modulator, wherein the light modulator comprises a single opaque centrally arranged on a generally transparent member; and
a sensor module configured to detect relative motion between the light contrast pattern and the sensor module,
wherein the sensor module comprises a photodetector array, with a surface area of the photodetector array being substantially larger than a surface area of the single opaque portion of the light modulator.

11. An apparatus for capturing user control inputs, the apparatus comprising:
a light source;
a navigation surface arranged relative to the light source and including an at least partially transparent region to enable transmission of light from the light source through the navigation surface, thereby generating transmissive light patterns from the navigation surface; and
an optical navigation sensor including a photodetector array, the optical navigation sensor configured for generating digital images based on the transmissive light patterns sensed at the photodetector array and the optical navigation sensor configured to perform a movement computation based on a comparison of the digital images over time and to generate movement data based on the movement computation that is indicative of relative motion between the navigation surface and the navigation sensor.

12. The apparatus of claim 11, wherein the light source is at least one of a generally incoherent light source and a partially coherent light source.

13. The apparatus of claim 11 wherein the light source and the navigation surface are fixed relative to each other and are moveable together relative to the navigation sensor.

14. A method of capturing control inputs for an electronic device, the method comprising:
projecting a light pattern of varying light intensities, via a light modulator, onto an optical sensor;
causing motion of the projected light pattern relative to the optical sensor in which the motion represents at least one selectable function of the electronic device; and
detecting images, via the optical sensor, corresponding to relative motion between the projected light pattern and the optical sensor and comparing the detected images over time to generate movement information; and
directing execution of the at least one selectable function based on the movement information.

15. The method of claim 14, wherein projecting the light pattern comprises:
arranging a light source and the light modulator in a housing; and
wherein causing motion of the projected light pattern relative to the optical sensor comprises:
slidably moving the housing relative to a support structure adjacent the optical sensor.

16. The method of claim 14 wherein causing motion of pattern comprises:
restricting the relative motion between the pattern and the optical sensor along a single dimension.

17. An input device for capturing user control inputs, the input device comprising:
a light source configured to emit a path of light and comprising a light emitting diode;
a light modulator arranged relative to the light source transversely across the path of light to produce a light contrast pattern from the light modulator, wherein the light modulator comprises a mask defining a pseudo-random pattern of opaque portions; and
an optical navigation sensor module configured to detect relative motion between the light contrast pattern and the optical navigation sensor module.

18. An input device for capturing user control inputs, the input device comprising:
a light source configured to emit a path of light, the light source comprising a light emitting device in optical communication with a light pipe and diffuser;
a light modulator arranged relative to the light source transversely across the path of light to produce a light contrast pattern from the light modulator, wherein the light modulator comprises a grid; and
a sensor module configured to detect relative motion between the light contrast pattern and the sensor module, wherein the sensor module comprises at least one photocell array.

19. The input device of claim 18 wherein the grid defines a generally transparent member and a first channel of opaque marking portions and a second channel of opaque marking portions arranged on the generally transparent member for positioning relative to the at least one photocell array.

20. The input device of claim 18 wherein the light source is at least one of a generally incoherent light source and a partially coherent light source.

21. An input device for capturing user control inputs, the input device comprising:
a light source configured to emit a path of light;
a light modulator arranged relative to the light source transversely across the path of light to produce a light contrast pattern from the light modulator; and
a sensor module configured to detect relative motion between the light contrast pattern and the sensor module, wherein the sensor module comprises a photodetector array,
wherein the light modulator is configured so that the light contrast pattern has a surface area substantially larger than a surface area of the photodetector array of the sensor module.

* * * * *